(12) United States Patent
Schütz

(10) Patent No.: US 6,328,332 B1
(45) Date of Patent: Dec. 11, 2001

(54) PRE-ASSEMBLED GAS BAG MODULE

(75) Inventor: Dominik Schütz, Waldaschaff (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/389,147

(22) Filed: Sep. 2, 1999

(30) Foreign Application Priority Data

Sep. 4, 1998 (DE) .............................................. 298 15 940

(51) Int. Cl.⁷ .................................................... B60R 21/16
(52) U.S. Cl. ........................................ 280/728.2; 280/741
(58) Field of Search ............................ 280/728.2, 731, 280/741, 736, 743.1

(56) References Cited

U.S. PATENT DOCUMENTS

| | | |
|---|---|---|
| 5,423,568 | 6/1995 | Zushi et al. . |
| 5,427,406 | 6/1995 | Zushi et al. . |
| 5,547,213 * | 8/1996 | Lang et al. ........................ 280/728.2 |
| 5,613,700 * | 3/1997 | Hiramitsu et al. ................ 280/728.2 |
| 5,772,241 * | 6/1998 | Heilig ................................... 280/731 |
| 5,791,682 * | 8/1998 | Hiramitsu et al. ................ 280/728.2 |
| 5,931,491 * | 8/1999 | Bosgeiter et al. ................ 280/728.2 |
| 5,947,509 * | 9/1999 | Ricks et al. ....................... 280/728.2 |
| 5,992,874 * | 11/1999 | Sugiyama et al. ................ 280/728.2 |
| 6,017,054 * | 1/2000 | Magoteaux ....................... 280/728.2 |
| 6,068,294 * | 5/2000 | Jordan .................................. 280/741 |

FOREIGN PATENT DOCUMENTS 29723033   4/1998   (DE) .

* cited by examiner

Primary Examiner—Eric Culbreth
Assistant Examiner—David R. Dunn
(74) Attorney, Agent, or Firm—Tarolli, Sundheim, Covell, Tummino & Szabo L.L.P.

(57) ABSTRACT

A pre-assembled gas bag module comprises a generally cup-shaped carrier, a gas generator mounted on the carrier, an inflatable gas bag and a retaining plate for retaining the gas bag on the carrier. An edge of the gas bag is clamped between the carrier and the retaining plate. The carrier, retaining plate and gas bag have mutually aligned assembly openings for accommodation of the gas generator. The gas generator has a housing of a flangeless configuration and provided with mechanical interlock members for cooperation with corresponding interlock members provided on the carrier, to provide a bayonet-type or a snap mounting type connection of the gas generator to the carrier.

14 Claims, 3 Drawing Sheets

PRE-ASSEMBLED GAS BAG MODULE

BACKGROUND OF THE INVENTION

In current designs of gas bag modules, also termed airbag modules, the gas generator is attached directly to the partially assembled module by means of bolts and nuts as part of the assembly procedure, which requires a flange fitted to the housing of the gas generator. The disadvantage of these means of attachment and the consequent effect on the assembly sequence consists in that the batch quality control of the completed modules has to take place already at the production line and that any subsequent transportation of the modules fitted with gas generators can only proceed within the prescribed safety rules and regulations as applicable to hazardous goods. Furthermore, the flange at the gas generator housing requires assembly space and has to be differently positioned to suit the module involved, so that it becomes very difficult to standardize the housing for the gas generator and the advantages inherent in large batch production of such housings can only be reaped to a limited extent.

SUMMARY OF THE INVENTION

The present invention provides an improved gas bag module which permits the large-batch production of the housings for the gas generator with standardized dimensions, and which allow the gas bag module to be pre-assembled without the gas generator and to be stored and moved without having to resort to special safety measures. Where, in the case of different gas bag module types, the gas generator has to be positioned at different heights in relation to the gas generator carrier, it should be possible to realize such design modifications without the relatively expensive housing of the gas generator being affected, but rather by other means.

In order to solve this problem the present invention provides a pre-assembled gas bag module comprising a generally cup-shaped carrier, a gas generator mounted on the carrier, an inflatable gas bag and a retaining plate for retaining the gas bag on the carrier. An edge of the gas bag is clamped between the carrier and the retaining plate. The carrier, retaining plate and gas bag have mutually aligned assembly openings for accommodation of the gas generator. The gas generator has a housing of a flangeless configuration and provided with mechanical interlock members for cooperation with corresponding interlock members provided on the carrier, to provide a bayonet-type or a snap mounting type connection of the gas generator to the carrier. Due to the variety of connection modes possible with flangeless housings, the gas or air bag module may be pre-assembled without the gas generator and stored and transported without any problem as a non-hazardous unit. In the case of the previously often used flanged housings, the bolts, by means of which the rim of the gas inlet port of the gas bag was clamped between the gas bag retaining plate and the generator carrier, were used simultaneously for the attachment of the gas generator. When positioning the folded air bag in the gas bag module, the gas generator had, therefore, to be assembled at the same time or, as an alternative, the bolts holding together the pre-assembled gas bag module without the gas generator had to be loosened once more for the purpose of attaching the gas generator. By using a flangeless housing for the gas generator there is no longer any need to manufacture a separate housing with a correspondingly positioned flange for every different height position of the gas generator in relation to the generator carrier. The assembly procedure is made independent of others and the gas bag module can be handled without the gas generator being present. Finally, the philosophy of the invention may also imply economic advantages in that the customer is not forced to purchase both the air bag module and the gas generator from the same manufacturer.

BRIEF DESCRIPTION OF THE DRAWINGS

Further particulars are described in more detail with the help of the embodiment examples illustrated in FIGS. 1 to 5, where.

DETAILED DESCRIPTION OF THE INVENTION

Figure 1:
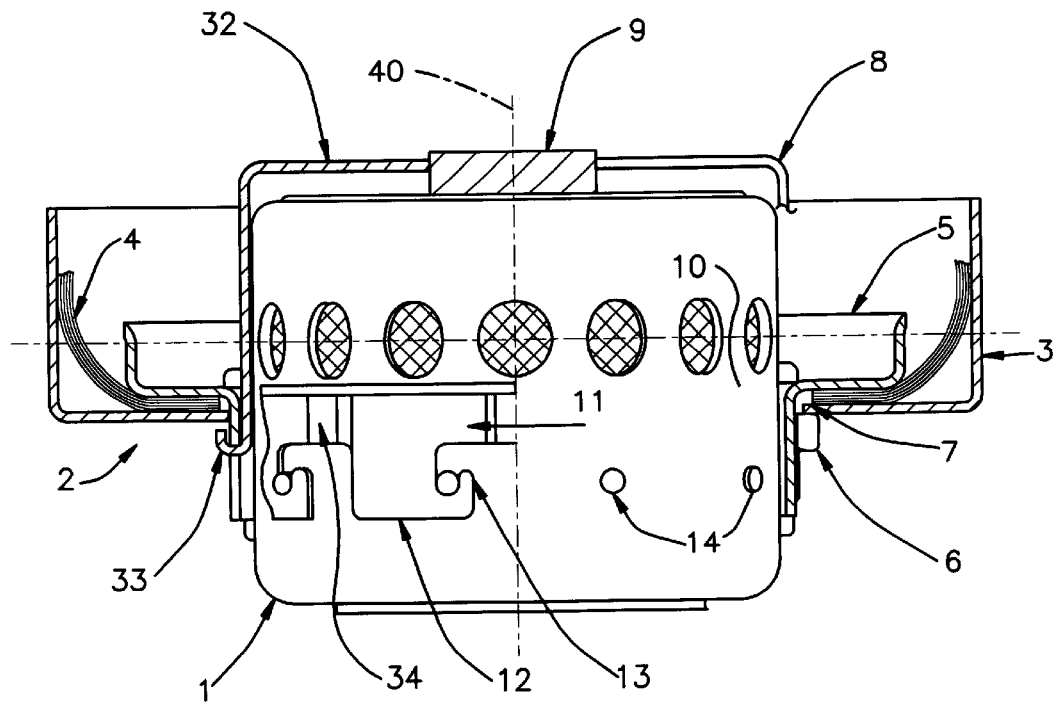
FIG. 1 shows a first embodiment of the invention with a bayonet-type connector.

FIG. 1 illustrates a pre-assembled gas or air bag module 2 with a cup-shaped generator carrier 3, an air bag 4, and an air bag retaining plate 5, the rim 7 of the attachment opening of the air bag 4 being clamped in the inherently known way between the air bag retaining plate 5 and the generator carrier 3 by the use of clamping means 6. The clamping means 6 is a nut and bolt configuration shown schematically in FIGS. 1–5.

In the case of this embodiment, the air bag retaining plate 5 is formed in one piece with a cylindrical neck 11, extending downwards through the attachment opening, which has a plurality of flange sections 12 pointing downwards and distributed over its circumference, which are provided with hook-shaped sections 13 open towards the top. A corresponding number of radially outward pointing pins 14 are provided at the housing 10 of the gas generator 1, which engage with the hook-shaped sections 13 in the way of a bayonet connector, as a result of which the gas generator 1 is secured to the air bag module 2.

The embodiment of the invention illustrated in FIG. 1 is furthermore provided with a cover piece 8, limiting the attachment opening towards the air bag 4, the lower rim of which is provided with hooks 33, bent outwards and upwards, which engage in corresponding cutouts 34 of the cylindrical neck 11. Between the cover piece 8 and the housing 10 of the gas generator 1 there is an elastic biasing element in the form of a rubber buffer 9 to provide the pretension permanently required in bayonet connectors by which the pins 14 are pressed against the hook-shaped sections 13. The cover piece 8 may be embodied as a cup-shaped component or it may consist of a plurality of latticed webs 32.

Figure 2:
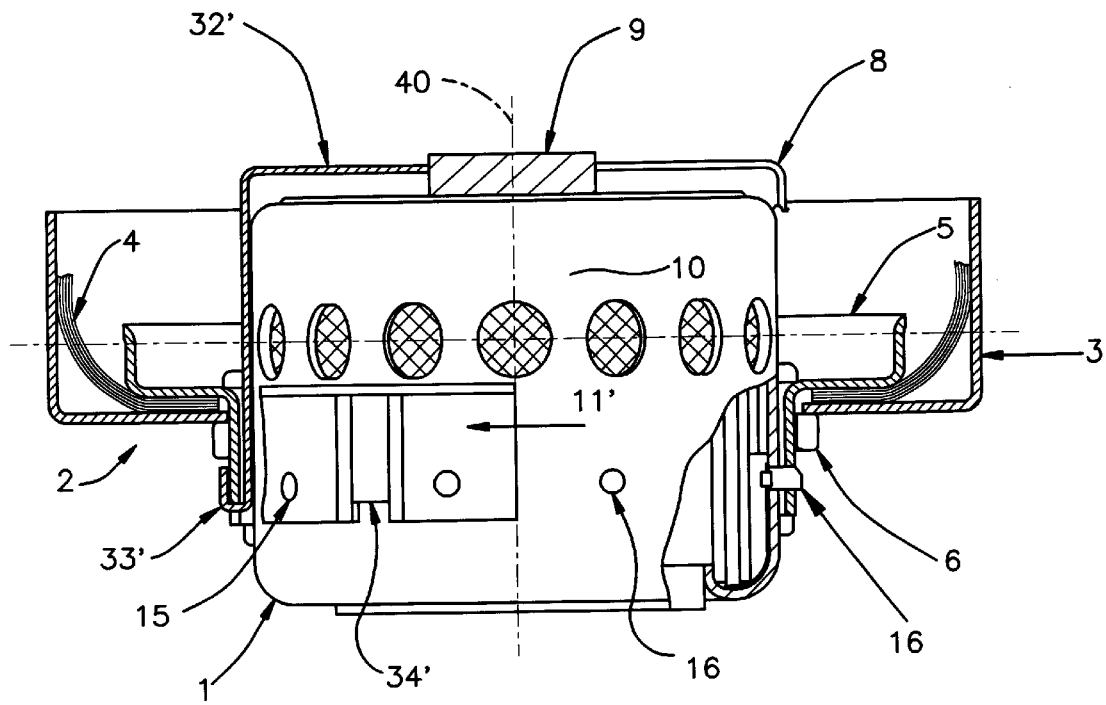
FIG. 2 shows a second embodiment of the invention with a snap-in connector.

The embodiment according to FIG. 2 differs from that shown in FIG. 1 in that a plurality of radial bores 15 are provided as distributed over the periphery of the cylindrical neck 11', which bores can be engaged by pins 16 arranged at the housing 10 of the gas generator 1 and movable radially inwards against return forces. All the remaining reference numbers have the same meaning as in FIG. 1 and shall not be explained again in this context.

Figure 3:
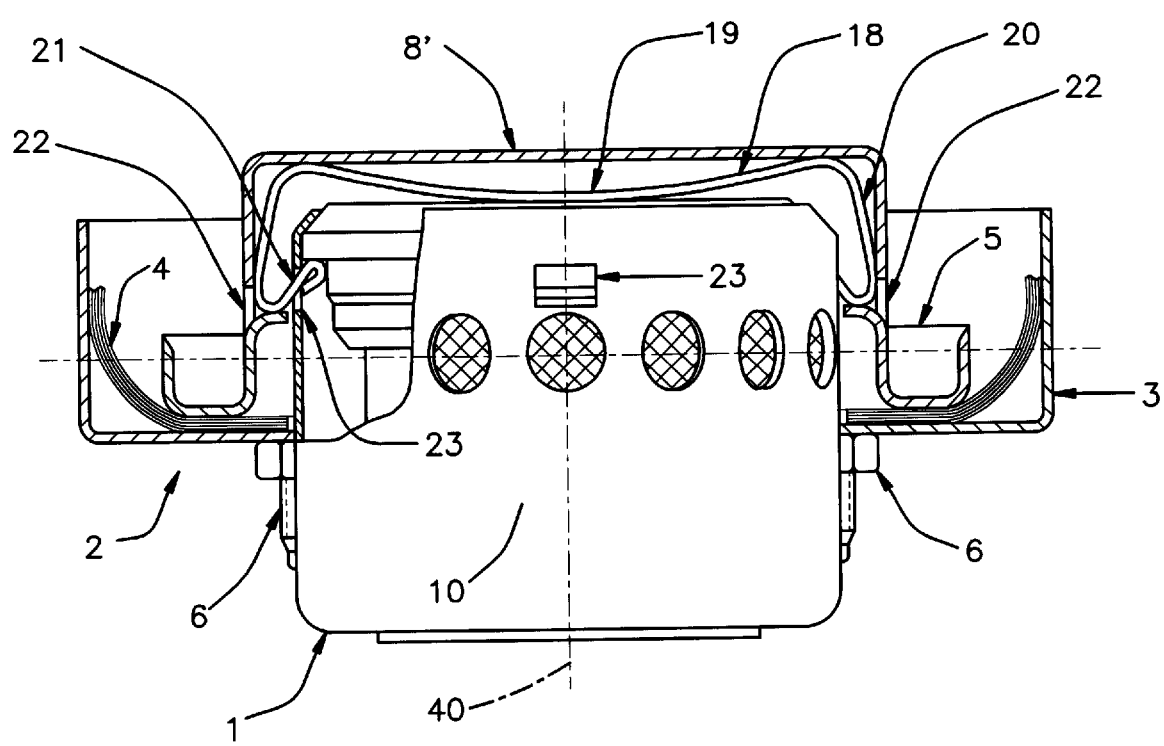
FIG. 3 shows another embodiment of the invention with a snap-in connector.

In the case of the embodiment according to FIG. 3, a cover piece 8' is formed in one piece with the air bag retaining plate 5. In order to attach the gas generator 1 within the air bag module 2, at least one spring stirrup 18 is provided, the convex shaped middle section 19 of which is braced under pretension against the housing 10 in the final assembly state, whilst its rim areas rest against the cover piece 8'. The spring stirrup 18 has side sections 20 bent at a downward angle, which are bent inwards at their extremes, and which are braced against the flange areas 22 of the cover piece 8' which are bent inwards at an angle. The ends 21 of the side sections 20 are bent inwards and upwards and so engage into the cutouts 23 in the housing wall 10, when in the assembled state, causing the gas generator to be clamped in the cover piece 8' by the pressure of the spring stirrup 18. All the remaining reference numbers have the same meaning as in FIG. 1 and shall not be explained again in this context.

Figure 4:
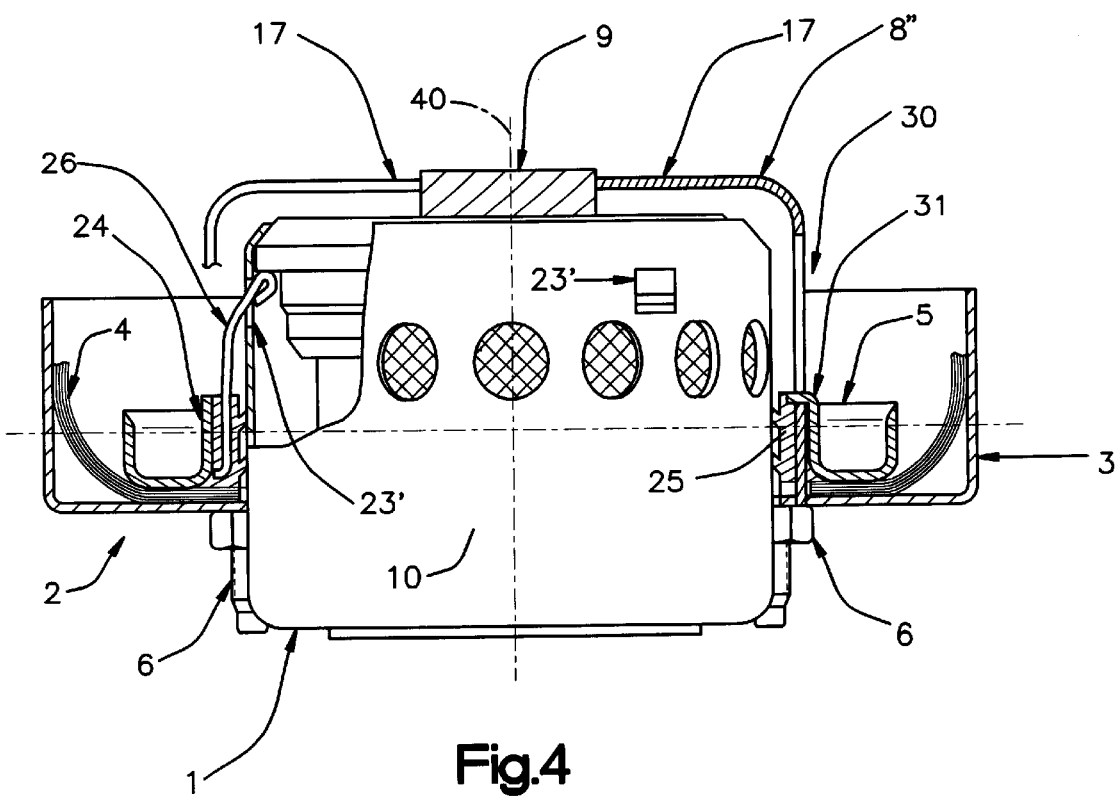
FIG. 4 shows a further variant of the invention with a snap-in connector.

In the embodiment according to FIG. 4, the cover piece 8" consists of a plurality of metal stirrups 17 with a centrally arranged rubber buffer 9. The ends of the metal stirrups 17 are bent downwards and are provided with elongated holes 30 extending in a direction of a steering wheel axis 40 into which engage radially inwards extending developments 31 of the air bag retaining plate 5. The air bag retaining plate 5 has a cylindrical wall section 24, extending coaxially to the side wall of the housing 10, to guide the bottom ends of the metal stirrups 17. Between the wall section 24 and the side wall of the housing 10 there is a surrounding elastic seal 25, into which are embedded the lower extremes of three or more hooks 26 whose upper ends, when in the fully assembled state, engage into the corresponding cutouts 23' in the housing 10, thereby providing an elastic joint between the gas generator 1 and the air bag module 2. The remaining reference numbers have the same meaning as in FIG. 1 and shall not be explained again in this context.

Figure 5:
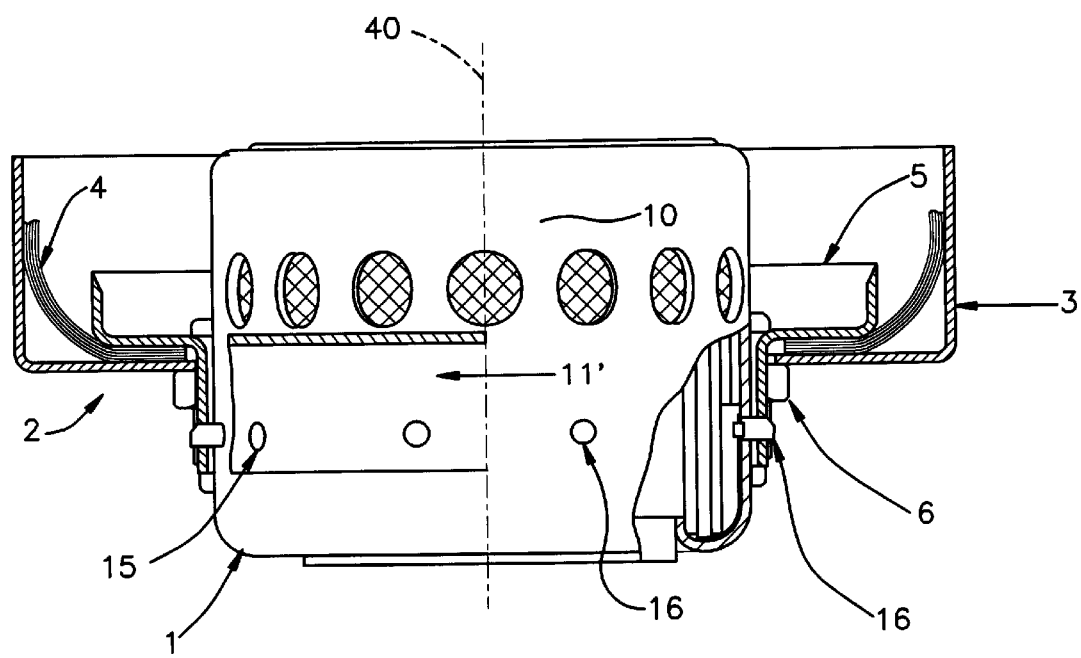
FIG. 5 shows a modification of the embodiment illustrated in FIG. 2.

FIG. 5 represents a modified version of the embodiment example illustrated in FIG. 2. In this case, the cover piece 8 with the rubber buffer 9 has been omitted, because the cylindrical neck 11' with its radial bores, as well as the pins 16, provided at the housing 10 of the generator and radially pre-tensioned outwards, can now also be designed in such a way that a cover piece becomes superfluous. It is clear that, as a consequence, there will then be no need either for the constructional details otherwise required for the attachment of the cover piece 8 (positions 33' and 34' in FIG. 2). The remaining reference Figures require no further explanation.

What is claimed is:

1. A pre-assembled gas bag module comprising:
   a generally cup-shaped carrier,
   a gas generator mounted on said carrier,
   an inflatable gas bag,
   a retaining plate for retaining said gas bag on said carrier, and
   clamping means for clamping an edge of said gas bag between said carrier and said retaining plate,
   said carrier, said retaining plate and said gas bag having mutually aligned assembly openings for accommodation of said gas generator,
   said retaining plate comprising a cylindrical neck which extends through said assembly openings of said carrier and said air bag,
   said gas generator having a housing of a flangeless configuration and provided with mechanical interlock members for cooperation with corresponding interlock members,
   said corresponding interlock members being provided on said cylindrical neck of said retaining plate for attaching said housing of said gas generator.

2. A pre-assembled gas bag module comprising:
   a generally cup-shaped carrier,
   a gas generator mounted on said carrier,
   an inflatable gas bag,
   a retaining plate for retaining said gas bag on said carrier, and
   clamping means for clamping an edge of said gas bag between said carrier and said retaining plate,
   said carrier, said retaining plate and said gas bag having mutually aligned assembly openings for accommodation of said gas generator,
   said retaining plate comprising a cylindrical neck which extends through said assembly openings, said gas generator having a housing of a flangeless configuration and provided with mechanical interlock members for cooperation with corresponding interlock members being provided on said cylindrical neck of said retaining plate,
   said interlock members of said retaining plate comprising a plurality of downward-pointing flange sections formed as distributed around the circumference of said cylindrical neck at a lower rim portion thereof, said flange sections having a hook-shaped section open upwardly,
   said corresponding interlock members of said gas generator comprising a corresponding number of radially outward projecting pins forming a bayonet connection with said hook-shaped sections.

3. A pre-assembled gas bag module comprising:
   a generally cup-shaped carrier,
   a gas generator mounted on said carrier,
   an inflatable gas bag,
   a retaining plate for retaining said gas bag on said carrier, and
   clamping means for clamping an edge of said gas bag between said carrier and said retaining plate,
   said carrier, said retaining plate and said gas bag having mutually aligned assembly openings for accommodation of said gas generator,
   said retaining plate comprising a cylindrical neck which extends through said assembly openings,
   said gas generator having a housing of a flangeless configuration and provided with mechanical interlock members for cooperation with corresponding interlock members being provided on said cylindrical neck of said retaining plate,
   said interlock members of said retaining plate comprising a plurality of radial bores being provided as distributed around the circumference of said cylindrical neck,
   said bores being able to be engaged by pins arranged at said housing of said gas generator and being movable radially inwards against return forces forming a snap-in connection in conjunction with said radial bores.

4. A pre-assembled gas bag module comprising:
   a generally cup-shaped carrier,
   a gas generator mounted on said carrier,
   an inflatable gas bag,
   a retaining plate for retaining said gas bag on said carrier, and
   clamping means for clamping an edge of said gas bag between said carrier and said retaining plate,
   said carrier, said retaining plate and said gas bag having mutually aligned assembly openings for accommodation of said gas generator, said gas generator having a housing of a flangeless configuration and provided with mechanical interlock members for cooperation with corresponding interlock members provided on said retaining plate, said pre-assembled gas bag module further comprising a pot-shaped cover member being mounted in said assembly openings of said carrier and said retaining plate, said cover member delimiting an accommodation space for said gas generator housing and having a closed bottom, said gas generator housing abutting a resilient abutment member at said closed bottom of said cover member.

5. The module according to claim 4, wherein said cover member comprises at least one web extending between said gas generator housing and said retaining plate, said web having a lower end which is bent outwards and upwards and engaging in cutouts, said cutouts being formed at a Lower rim of said cylindrical neck of said retaining plate.

6. The module according to claim 4, wherein said cover member is formed in one piece with said retaining plate.

7. A pre-assembled gas bag module comprising:

a generally cup-shaped carrier, a gas generator mounted on said carrier, an inflatable gas bag, a retaining plate for retaining said gas bag on said carrier, and clamping means for clamping an edge of said gas bag between said carrier and said retaining plate, said carrier, said retaining plate and said gas bag having mutually aligned assembly openings for accommodation of said gas generator, said gas generator having a housing of a flangeless configuration and provided with mechanical interlock members for cooperation with corresponding inter-Lock members provided on said retaining plate, said pre-assembled gas bag module further comprising a pot-shaped cover member being mounted in said assembly openings of said carrier and said retaining plate, said cover member delimiting an accommodation space for said gas generator housing and having a closed bottom, said gas generator housing abutting a resilient abutment member at said closed bottom of said cover member, said cover member consisting of a plurality of metal stirrups with a centrally arranged rubber buffer.

8. The module according to claim 7, wherein said metal stirrups are provided with elongated holes extending in a direction of a steering wheel axis said retaining plate having inward pointing bent portions engaging into said holes.

9. The module according to claim 8, wherein said retaining plate has a cylindrical wall section for guiding lower ends of said metal stirrups in a coaxial configuration with respect to a side wall of said housing of said generator.

10. The module according to claim 9, wherein a surrounding elastic seal is arranged between said wall section and said side wall of said housing.

11. The module according to claim 10, wherein a plurality of hooks are partially embedded in the seal, said hooks having free ends extending from said seal and engaging into cutouts in said housing of said gas generator, thereby elastically mounting said gas generator on said carrier.

12. A pre-assembled gas bag module comprising:

a generally cup-shaped carrier, a gas generator mounted on said carrier, an inflatable gas bag, a retaining plate for retaining said gas bag on said carrier, and clamping means for clamping an edge of said gas bag between said carrier and said retaining plate, said carrier, said retaining plate and said gas bag having mutually aligned assembly openings for accommodation of said gas generator, said gas generator having a housing of a flangeless configuration and provided with mechanical interlock members for cooperation with corresponding interlock members provided on said retaining plate, said pre-assembled gas bag module further comprising a pot-shaped cover member being formed in one piece with said retaining plate, said cover member delimiting an accommodation space for said gas generator housing and having a closed bottom, said gas generator housing abutting a resilient abutment member at said closed bottom of said cover member, said resilient abutment member comprising at least one spring stirrup being provided between said cover member and said housing of said gas generator, said stirrup having a convex middle section curved towards said gas generator and inwardly tent end sections abutting against radially inwardly bent flange portions of said cover member, said gas generator being secured to said cover member by means of said end sections engaging into cutouts in said housing, and simultaneously urging said housing against said convex middle section of said stirrup.

13. The module according to claim 12, wherein said spring stirrup is three-armed and has three of said end sections.

14. A gas bag module comprising:

a generally cup-shaped carrier having a radially extending mounting surface and a sidewall projecting axially from said mounting surface, an inflatable gas bag, a gas generator for providing gas for inflating said gas bag, a retaining plate for retaining said gas bag on said carrier, and clamping means for clamping an edge of said gas bag between said carrier and said retaining plate, said carrier and said retaining plate engaging said edge of said gas bag when clamped by said clamping means, said carrier and said gas bag having mutually aligned openings, said retaining plate having a radially extending mounting surface and a sidewall projecting axially from said mounting surface and a cylindrical neck extending axially opposite said side wall from said mounting surface, said cylindrical neck extending through said aligned openings in said gas bag and said carrier, said cylindrical neck defining a passage extending through said retaining plate and through said cylindrical neck, said gas generator having a housing of a flangeless configuration, said housing being located in part in said gas bag and in part in said passage, said cylindrical neck engaging said housing when said housing s located in said passage, and mechanical interlock members on said housing for cooperation with corresponding interlock members provided on said cylindrical neck of said retaining plate for attaching said housing of said gas generator to said retaining plate.

* * * * *